United States Patent [19]

Bossina

[11] E Patent Number: Re. 33,247

[45] Reissued Date of Patent: Jul. 3, 1990

[54] DISPENSER FOR PASTE-LIKE PRODUCTS

[75] Inventor: Japp Bossina, Bussum, Netherlands

[73] Assignee: Gap Gesellschaft fur Auswertungen und Patente AG, Glarus, Netherlands

[21] Appl. No.: 170,087

[22] Filed: Mar. 10, 1988

Related U.S. Patent Documents

Reissue of:

[64] Patent No.: 4,511,068
Issued: Apr. 16, 1985
Appl. No.: 456,449
Filed: Jan. 7, 1983

U.S. Applications:

[63] Continuation of Ser. No. 942,923, Dec. 17, 1986, abandoned, which is a continuation of Ser. No. 814,653, Dec. 30, 1985, abandoned.

[51] Int. Cl.[5] ..... G01F 11/00

[52] U.S. Cl. ..... 222/257; 222/320; 222/387; 222/340

[58] Field of Search ..... 222/256, 257, 259, 260, 222/269, 320, 321, 386, 387, 391, 340, 341

[56] References Cited

U.S. PATENT DOCUMENTS

| | | | |
|---|---|---|---|
| 1,675,451 | 7/1928 | Davis | 222/259 |
| 1,720,376 | 7/1929 | Pierce et al. | 222/260 |
| 1,757,736 | 5/1930 | Pritchard | 222/340 |
| 1,793,493 | 2/1931 | Kreidel | 222/257 |
| 1,840,111 | 1/1932 | Kreidel | 222/257 |
| 1,975,545 | 10/1934 | Homewood et al. | 222/321 |
| 2,981,445 | 4/1961 | Russell | 222/259 |
| 3,088,636 | 5/1963 | Spatz | 222/387 |
| 3,268,123 | 8/1966 | Spatz | 222/400.5 |
| 3,870,200 | 3/1975 | Spatz . | |
| 4,278,187 | 7/1981 | Luedtke | 222/321 |
| 4,301,948 | 11/1981 | Czeck et al. | 222/341 |
| 4,323,175 | 4/1982 | Eckert | 222/387 |
| 4,402,431 | 9/1983 | Weigner et al. | 222/260 |
| 4,413,759 | 11/1983 | Mettenbrink | 222/260 |

*Primary Examiner*—H. Grant Skaggs
*Attorney, Agent, or Firm*—James E. Nilles; Thomas F. Kirby

[57] ABSTRACT

A dispenser for paste-like products comprising a preferably cylindrical container for the product to be dispensed is provided with delivery device in the form of a delivery piston (6), the surface area of which is substantially equal to the interior cross-sectional area of the container (7). Connected to this piston is a dispensing structure (2) including a value (4). The delivery piston is disposed within the upper end portion of the container and is designed for manual operation.

7 Claims, 2 Drawing Sheets

DISPENSER FOR PASTE-LIKE PRODUCTS

Figure 1:
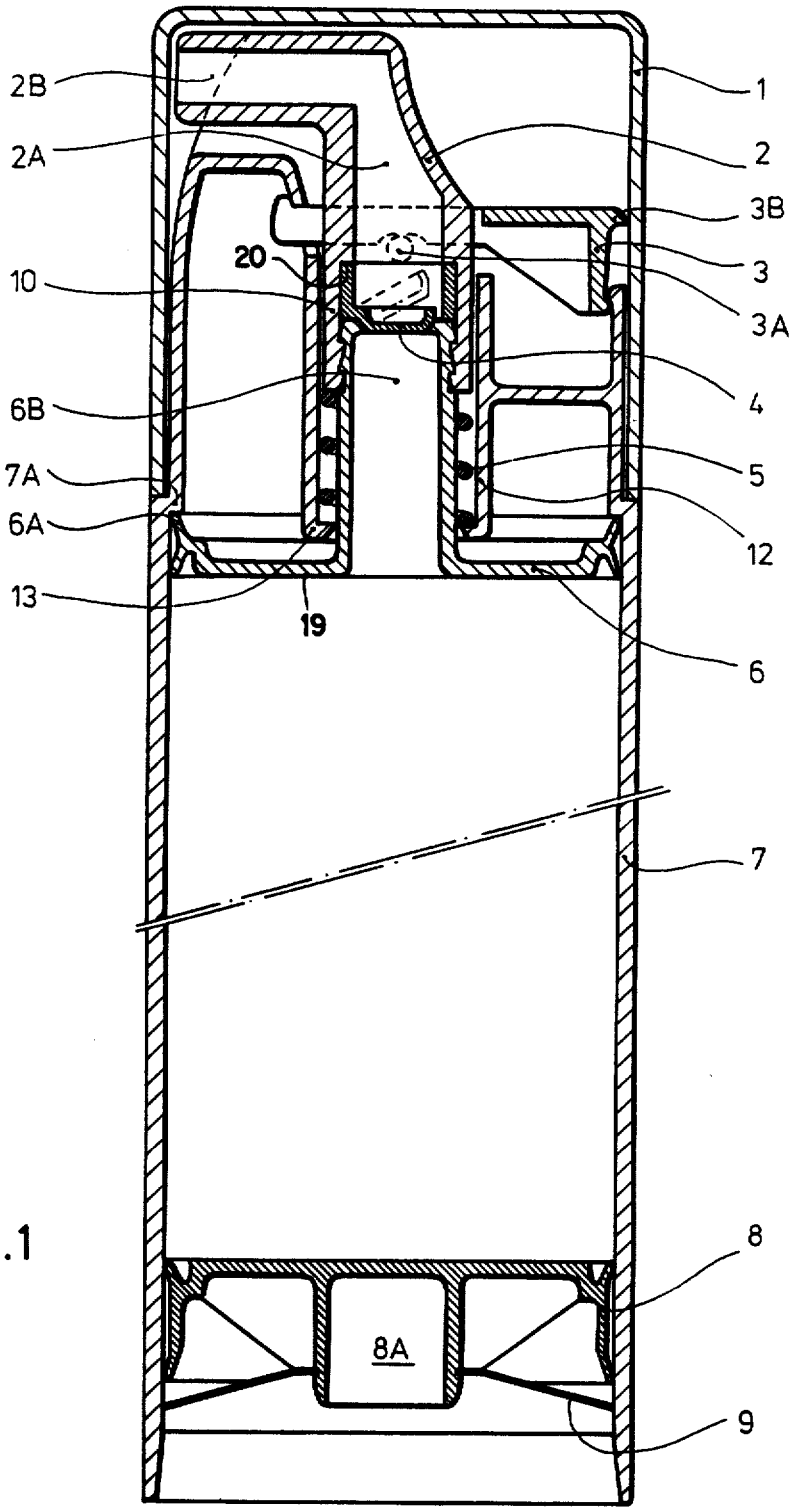

Matter enclosed in heavy brackets [ ] appears in the original patent but forms no part of this reissue specification; matter printed in italics indicates the additions made by reissue.

*This application is a continuation of application Ser. No. 942,923, filed Dec. 17, 1986, now abandoned. U.S. patent application Ser. No. 814,653, which is the parent reissue application of Ser. No. 942,923 reissue application and which was unintentionally abandoned, was revived for purposes of continuity only of Ser. No. 942,923 reissue application and was again abandoned as of June 15, 1987, the date of the U.S. Patent and Trademark Office decision reviving Ser. No. 942,923.*

This invention relates to a dispenser for paste-like products, comprising a substantially cylindrical container containing the product to be dispensed and having its upper end provided with a manually operable delivery means and a dispensing means provided with a valve, while its lower end contains a closure piston adapted to be displaced along the container interior wall surface by atmospheric pressure. This type of a dispenser for paste-like products is already known from No. DE-A-2,901,717.

In this known dispenser, the upper end of the container is closed by a partition separating the container from a head member comprising an applicator and operating means. The interior of the head member of the known dispenser is formed with a pump chamber adapted to have its volume varied by operation from the exterior, said pump chamber communicating with the interior of the container through a non-return valve disposed in said partition.

Furthermore the known dispenser is provided with a closure piston for closing the lower end of the full container, said piston being sealingly and slidingly guided along the interior wall surface of the container for reducing the container volume under the action of the ambient atmospheric pressure in response to the product being dispensed from the container, so that the outer shape of the container remains unchanged, while preventing the formation of a vacuum within the container and/or the intrusion of air into the container.

The known dispenser is operated by applying pressure to the head member for reducing the volume of the pump chamber formed within the head member, whereby the product contained within the pump chamber is outwardly displaced through said applicator. During the reduction of the pump chamber volume the valve in the partition between the head member and the container is closed, so that there is no communication between the container interior and the pump chamber.

The manufacture of this known dispenser is relatively expensive, since the rather complicated head member cannot be integrally formed in one piece, while the manufacture is further complicated and rendered more expensive by the provision of the partition between the head member and the container interior, including the valve means disposed in the partition.

It is therefore an object of the invention to provide a dispenser of the type set forth in the introduction, which is of simplified construction lending itself to a more economical manufacture.

According to the invention, in a dispenser of the type set forth in the introduction this object is attained by providing that said delivery means is in the form of a delivery piston, the piston end face of which is substantially of the same size as the interior cross-sectional area of the container, and in that said dispensing means including said valve is connected to said delivery piston.

The technical improvement achieved by the invention results in the first place from the ease of manufacture of the dispenser, since the head nember may be integrally formed in one piece, and a partition between the head member and the container is not required.

Since according to the invention the delivery piston is of substantially the same size as the closure piston, the dispensing of relatively great product amounts requires only a rather small stroke of the outlet end of the dispensing means. This is of particular advantage, if the dispenser is employed for dispensing toothpaste or the like, as a long stroke of the outlet end of the dispensing means would render the properly aimed application of the toothpaste onto the toothbrush unduly difficult.

In a first embodiment of the invention, the forces required for operating the dispenser may be readily adjusted by properly selecting the lever arm lengths of a thumb lever cooperating with the delivery piston. By properly dimensioning the thumb lever it is thus possible to ensure that infants are unable to operate the dispenser.

A particular advantage of the dispenser according to the invention is to be seen in the fact that its design is eminently suitable for relatively small-diameter containers, so that the dispenser according to the invention is fuly operable even with very small dimensions such as in the case of mini-packages.

In an advantageous embodiment the invention provides that the lower end of the dispensing means is operatively connected to the central portion of the delivery piston containing said valve.

It has further been found advantageous that the dispenser according to the invention is provided with a pivotally mounted thumb lever cooperating with the delivery piston, since this arrangement permits the forces required for operating the dispenser to be adjusted by properly selecting the dimensions of the thumb lever, as already mentioned above.

The thumb lever is preferably mounted within the dispensing means, so that displacement of the dispensing means results in a corresponding displacement of the delivery piston connected therewith.

There may further be provided spring means for returning the delivery piston to its rest position.

In a second embodiment of the invention, the above mentioned thumb lever is not required, the delivery piston being adapted to be directly operated by exerting pressure on a pressure surface on the dispensing means. The omission of the thumb lever forming an operating lever system in the first embodiment enables the dispenser according to the second embodiment of the invention to be manufactured with extremely small container diameters of for instance only 5 mm.

Figure 2:
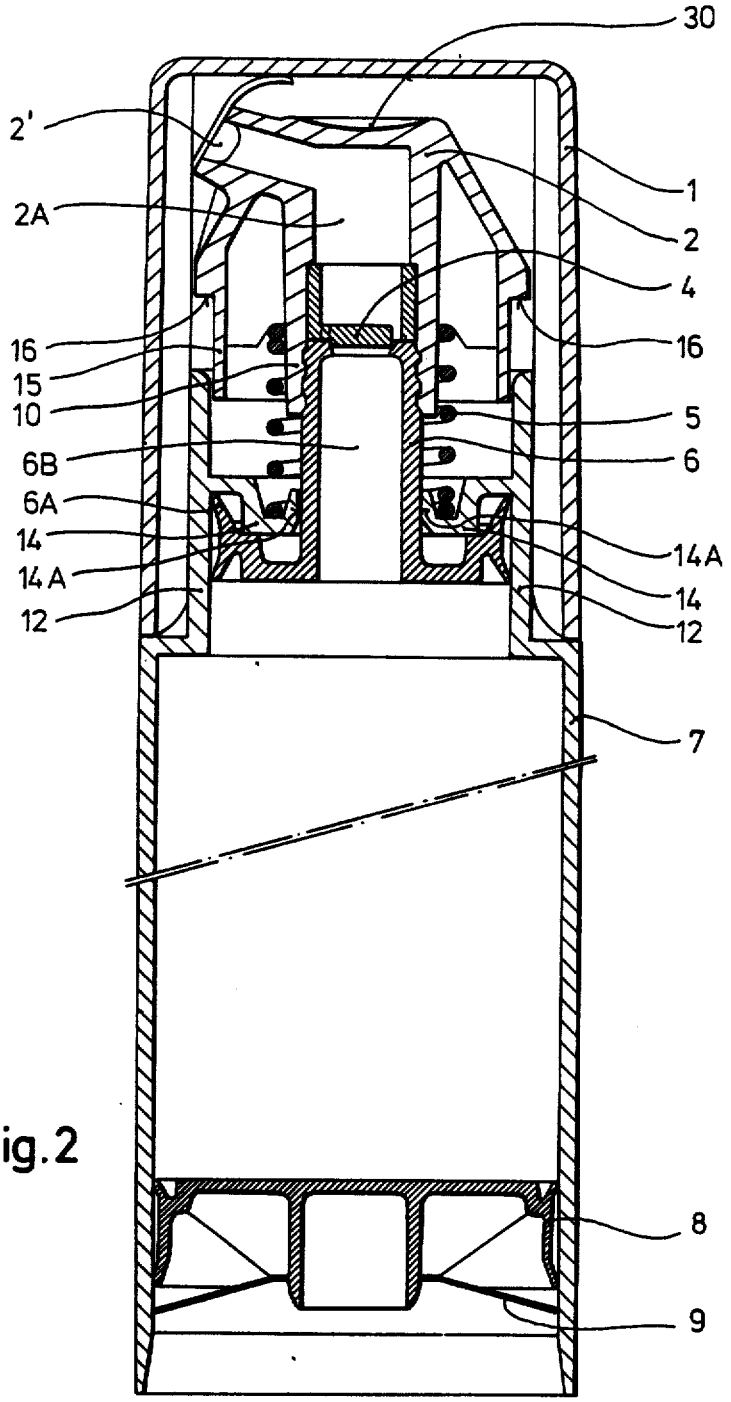

The two embodiments of the invention shall now be described in detail with reference to the accompanying drawings, wherein:

FIG. 1 shows a vertical sectional view of a dispenser according to a first embodiment of the invention, and FIG. 2 shows a vertical sectional view of a dispenser according to a second embodiment of the invention.

As shown in FIGS. 1 and 2, the dispenser comprises a container 7 of substantially cylindrical cross-sectional configuration, the lower end of which is closed by a closure piston 8 mounted in sealing engangement with the interior wall surface of container 7 and adapted to slide therealong in an upward direction from the position shown in response to a product contained in container 7 being dispensed therefrom. Connected to the upper end of container 7 is a dispenser means 2 operatively connected to a delivery piston 6 and protected by a removable thimble cover 1.

Delivery piston 6 forming the upper closure of the interior space of container 7 has a flange-like bottom portion 19 defining an effective piston face substantially corresponding in size to the interior cross-sectional area of container 7, with the exception of an outlet opening extending therethrough and having a non-return valve 4 located therein. The periphery of delivery piston 6 is formed with at least one slidable sealing lip 6A disposed in sealing engagement with the interior wall surface of container 7. The central portion of delivery piston 6 is provided with said outlet opening and non-return valve 4 associated therewith, said opening and valve being located in a plane extending above the plane of the main portion of the delivery piston. As shown in the drawings, the central portion of delivery piston 6 is formed with an upwardly extending, substantially cylindrical or frustoconical spout-like dispensing portion 6B, the upper and lower ends of which are determined by the plane of valve 4 and by the plane of the main portion of piston 6, respectively. The diameter of this tubular dispensing portion 6B substantially corresponds to that of the outlet opening closed by valve 4. The upper end of piston portion 6B communicates with an outlet channel 2A of dispensing means 2. Outlet channel 2A thus extends from valve 4 to an outlet opening 2B of dispensing means 2 (FIG. 1).

In the embodiment shown in the drawings, the lower end of a circumferential wall 10 of outlet channel 2A is rigidly connected to the upper end of piston portion 6B through hook-shaped engagement means formed on the interior wall surface of the lower end of wall 10 and on the outer wall surface of the upper end of piston portion 6B. The shown hook-shaped engagement means may of course be replaced for instance by threaded connection means between the lower end of channel wall 10 and the upper end of dispensing portion 6B. The lower edge of channel wall 10 defines a downwardly face upper spring seat. The upper end of the tubular piston portion 6B provides a seat for the non-return valve 4, and that valve is confined between said edge and an internal downwardly facing circumferential shoulder 20 in the circumferential wall 10, defined by a reduced inside diameter in its upper portion.

The upper end of container 7 has its central portion formed with a substantially cylindrical bushing portion 12, the circumferential wall of which extends substantially parallel to the center axis of the container. Bushing portion 12 is dimensioned so as to receive therein the projecting central dispensing portion 6B as well as the lower end of channel wall 10. In the first embodiment of the invention shown in FIG. 1, the lower end of bushing portion 12 is formed with an inwardly projecting rim portion 13 extending to a position closely adjacent the outer periphery of piston portion 6B and providing a lower spring seat. Located between rim portion 13 and the lower end of channel wall 10 is a compression spring 5, the lower end of which is supported by rim portion 13 and the upper end of which bears against said lower edge of channel wall 10. The interior wall surface of bushing portion 12 thus acts as guide means for the lower end of channel wall 10 and for the projecting central piston portion 6B. As already indicated, bushing portion 12 is rigidly connected with the peripheral wall of container 7.

FIG. 1 shows delivery piston 6 in its upper end position. In this position, sealing lip 6A is in engagement with an inwardly projecting shoulder 7A of container 7 which provides a downwardly face abutment that limits the upward movement of delivery piston 6 within container 7.

After removal of thimble cover 1 from container 7, a downwardly directed force may be exerted on delivery piston 6 as by exerting a corresponding pressure on dispensing means 2, whereby delivery piston 6 is moved downwards from the position shown. This movement causes the exerted pressure to be transmitted to the paste-like product contained within container 7, whereby a certain amount of the product escapes through valve 4, the opened position of which is shown in the drawings in broke lines. This product displaced product already contained within outlet channel 2A for discharge through outlet openings 2B for instance onto a toothbrush. As the pressure exerted on delivery piston 6, in the embodiment shown through dispensing means 2 rigidly connected to piston portion 6B, is released, delivery piston 6 is caused to return to its rest position shown in the drawings by the action of compression spring 5. At the same time the closure piston 8 located at the lower end of container 7 moves upwards by a distance corresponding to the dispensed amount of the product, since its free surface is exposed to the action of the ambient atmospheric pressure.

During the above described dispensing operation, dispensing means 2 is thus moved downwards over a limited distance, together with delivery piston 6. This causes outlet opening 2B to be likewise moved downwards from the position shown in FIG. 1 by the same distance thanks to the very large effective surface of delivery piston 6, which is, as already pointed out, substantially equal to the cross-sectional area of container 7 and thus also to the interior surface of closure piston 8, this stroke of outlet opening 2B is rather short in relation to the dispensed amount of the paste-like product, so that this movement of outlet opening 2B during operation of the dispenser does not lead to any problems with regard to the discharge location of the product. If instead of the relatively short stroke required by the dispenser according to the invention, the outlet opening would have to be displaced over a relatively long distance, it could easily happen that the toothbrush is missed, although correctly held in readiness.

During or even before the return of delivery piston 6 and dispensing means 2 to their rest position by the action of compression spring 5, non-return valve 4 again assumes its closed position shown in FIG. 1.

In the first embodiment of the dispenser shown in FIG. 1, there is preferably provided a pivotally mounted thumb lever 3 for exerting pressure on delivery piston 6. As shown in FIG. 1, thumb lever 3 is mounted for pivotal movement about a pivot axis 3A located on outer wall 10 of dispensing channel 2A. The pivot angle of thumb lever 3 may be limited so as to thereby limit the maximum amount of the product to be dispensed in one operation. In the embodiment shown in FIG. 1, the pivot angle of thumb lever 3 is limited by the engagement of the radially outer end 3B of lever 3 with the upper edge of container 7. In a modification (not shown) of this embodiment, the thumb lever end opposite to outer end 3B thereof may be supported by a projection on the container wall, particularly on or in bushing portion 12 thereof.

The force required for operating the dispenser may be determined by properly selecting the lever arm length of thumb lever 3. With the aid of a suitable lever geometry, the force required for operating the dispenser may thus be adjusted so as to prevent infants of preschool age from successfully operating the dispenser. Irrespective of this aspect, the lever arm geometry of thumb lever 3 may also be selected with a view to the type of paste-like product to be dispensed.

Closure piston 8 may be provided with locking elements 9 effective to permit only an upward movement of closure piston 8 within container 7. Such locking elements may be in the form of metal strips extending radially outwards from a central hub portion 8A of closure piston 8 into engagement with the interior wall surface of container 7, with their length being slightly greater than the distance between the outer periphery of hub portion 8A and the interior wall surface of container 7. This arrangement of locking element 9 effectively prevents closure piston 8 from moving towards the lower and of container 7.

The dispenser according to the above described first embodiment of the invention does not in practice permit the container diameter to be reduced to less than about 25 mm, as the length of the thumb lever employed for exerting pressure on delivery piston 6 may not be reduced beyond a certain measure without detracting from efficient operation of the delivery.

In the second embodiment of the invention as described hereinafter, however it is possible to considerably reduce the dimensions of the dispenser down to a diameter of for instance 5 mm or even less.

According to a preferred aspect of the second embodiment of the invention, the dispensing means is displaceable in the vertical direction relative to the container. In this embodiment, the dispensing means has a substantially cylindrical lower portion, the outer diameter of which substantially equals the interior diameter of a cylindrical upper portion of the container.

In accordance with a further advantageous aspect of the second embodiment of the invention, the dispensing means is provided with stop means cooperating with the container for limiting the downward movement of the dispensing means relative to the container.

Furthermore, the upper end portion of the container has its interior wall surface formed with the stiffener means provided with guide surfaces for a central portion of the delivery piston.

According to a further advantageous aspect of the second embodiment, the stiffener means is formed with support means for the lower end of a delivery piston return spring, the upper end of which engages complementary support means formed within the dispensing means. The stiffener means may additionally be formed as upper limit stop means for the delivery piston, so that the upward stroke of the delivery piston is limited thereby.

The container is advantageously of stepped configuration or formed with a varying diameter in any other manner as long as it is ensured that its upper end portion, in which the delivery piston is guided, is of cylindrical shape.

It may further be possible to connect containers of varying configuration and/or volume to one and the same dispenser head portion containing the delivery piston, the dispensing means, and the valve means.

In the second embodiment shown in FIG. 2, the dispenser comprises a container 7 of substantially cylindrical configuration at least in its upper portion. The lower end of container 7 is closed by a displaceable closure piston 8 adapted to be displaced by the ambient atmospheric pressure to slide along the container interior wall surface in an upward direction in response to a product being dispensed from dispenser container 7.

The dispenser further comprises a dispensing head connected to the upper end portion of container 7 and including dispensing means 2, valve means 4 and a delivery piston 6 with a return spring 5. The dispensing head is protected by a removable closure cap 1.

Delivery piston 6 forms the upper closure of the interior space of container 7 and has an effective piston surface area substantially corresponding to the interior cross-sectional area of container 7 at the level of the delivery piston less than area of an outlet passage controlled by valve means 4. The periphery of delivery piston 6 is formed with at least one slidable sealing lip 6A in sealing engagement with the upper end portion of the container interior wall surface. Located adjacent the center of delivery piston 6 is the outlet passage controlled by valve means 4, the latter being disposed in a plane extending at a somewhat higher level than the plane of the delivery piston main portion. As shown in the drawings, the central section of delivery piston 6 is thus formed with a substantially cylindrical or frustoconical piston portion 6B comprising a central tube extending from the plane of the main portion of delivery piston 6 upwards to the plane of valve means 4. The diameter of piston portion 6B is substantially equal to that of the outlet opening of delivery piston 6 controlled by valve means 4. The upper end of central piston portion 6B communicates with the lower end of an outlet channel 2A of dispensing means 2. Outlet channel 2A extends from valve means 4 to an outlet opening of dispensing means 2 provided with a closure member 2' in the embodiment shown. Closure member 2' is of course removable for uncovering the outlet opening of outlet channel 2A. Preferably closure member 2' has one of its pivotably attached to dispensing means 2.

The lower end of outlet channel 2A is designated by the reference numeral 10 in FIG. 2. This lower channel end 10 is rigidly connected to delivery piston 6 by hook-shaped engagement means formed on its interior wall surface and on the outer wall surface of the upper end portion of central piston portion 6B. The hook-shaped engagement means shown may of course be replaced by a screw-threaded connection between lower channel end 10 and the upper end of central piston portion 6B. The connection between the delivery piston and the lower outlet channel end may advantageously be releasable, so as to enable the dispensing head to be removed from an empty container and mounted onto a new container or a refilled container, respectively.

Container 7 has an upper end portion 12 of substantially cylindrical configuration and with a peripheral wall extending substantially parallel to the central axis of the container, the diameter of upper end portion 12 being selected such that the sealing lip 6A of delivery piston 6 is maintained in sealing engagement with its interior wall surface. As already mentioned, dispensing means 2 encloses the outlet channel 2A connecting valve means 4 with an outlet opening. Outlet channel 2A is surrounded by an annular wall portion 15, the outer periphery of which substantially corresponds to the inner periphery of upper end portion 12 of container 7. Annular wall portion 15 forms the outer wall of dispensing member 2. The upper end of dispensing member 2 is formed with a slightly depressed pushbutton or pressure surface 30 which is accessible after removal of closure cap 1 for exerting a downwards directed pressure thereon, such pressure being transmitted to the contents of the container for dispensing a certain amount thereof through valve means 4. The exertion of pressure on pressure surface 30 causes dispensing member 2 to be displaced vertically downwards relative to container 7, such downward movement of the dispensing member being limited by stop means 16 provided adjacent the upper end of outer annular wall portion 15. At the lower end of the downward stroke of the dispensing member, stop means 16 comes into engagement with the upper edge of upper container portion 12.

Upper container portion 12 is provided with stiffener means 14, the inner ends of which are formed with guide surfaces 14A for the central piston portion 6B extending parallel to the longitudinal axis of container 7. Stiffener means 14 is further formed with recessed support means for supporting the lower end of return spring 5. The upper end of return spring 5, shown in the drawings as being a helical compression spring, is in engagement with suitable support means within dispensing member 2, with the main portion of spring 5 surrounding central piston portion 6B or at least lower end portion 10 of outlet channel 2A.

FIG. 2 shows delivery piston 6 in its upper end position with its sealing lip 6A engaging an inwards projecting shoulder of upper container portion 12, said shoulder being formed between the container interior wall surface and stiffener means 14. Stiffener means 14 thus also acts as a stop for limiting the upward stroke of sealing lip 6A along the interior wall surface of upper container portions 12.

Below its upper end, particularly below upper end portion 12 required for guiding delivery piston 6 during its displacement, container 7 may be designed to have any suitable shape, including configurations with varying diameter and/or cross-sectional shape. Over the length of the stroke of delivery piston 6, the configuration of upper container portion 12 has of course to correspond to that of sealing lip 6A in order to ensure efficient operation of the delivery piston.

After the pressure exerted on pressure surface 30 and thus on delivery piston 6 has been released, delivery piston 6 is returned to its rest position shown in the drawings by the action of return spring 5. At the same time closure piston 8 closing the lower end of container 7 is moved upwards by the action of the ambient atmospheric pressure on its outer piston face over a distance corresponding to the amount of the dispensed container contents. Closure piston 8 may be provided with locking elements 9 permitting closure piston 8 to move within container 7 only in an upward direction, while preventing any downward movement of the piston.

By suitably limiting the stroke of dispensing member 2 relative to container 7, the volume to be dispensed may be adjusted for instance between 0.25 $cm^3$ for a stroke of one millimeter, and a maximum volume of 1.25 $cm^3$ for the maximum stroke.

As already pointed out, outer annular wall portion 15 of dispensing member 2 is preferably provided with stop means 16 cooperating with the upper edge of upper container portion 12 for limiting the dispensing stroke of the delivery piston. In addition, or in place thereof, the maximum stroke of delivery piston 6 may be determined by the engagement of the lower edge of outer annular wall portion 15 with the upper surface of stiffener means 14.

The force required for operating the dispenser may be suitably determined by properly dimensioning the length of the dispensing stroke and by properly selecting the spring constant of return spring 5, whereby to prevent infants of pre-school age from effectively operating the dispenser.

I claim:

1. A dispenser for paste-like products comprising a container for holding a supply of product to be dispensed, said container having a lower cylindrical wall portion that is closed by a closure piston which is slideable upwardly therein and is displaced upwardly by ambient atmospheric pressure as product is dispensed from the container, and repetitively actuatable delivery means at an upper portion of the container whereby a limited amount of product can be dispensed at each actuation, said delivery means being characterized by:

A. a delivery piston comprising
  (1) an upright central tube and
  (2) a concentric, radially outwardly projecting flange around the bottom of said central tube, the periphery of which is formed as a sealing lip that axially slideably and sealingly engages an upper cylindrical wall portion of the container all around the same;

B. a tubular outlet member
  (1) having a product outlet at an upper end thereof, and
  (2) having a lower portion which surrounds and is secured to the upper portion of said central tube of the delivery piston and which defines
    (a) an internal downwardly face circumferential shoulder that opposes the top end of said central tube and
    (b) a downwardly facing spring seat external to said central tube;

C. [non-return valve] means surrounded by said outlet member and confined between said internal shoulder and the top end of said central tube of the delivery piston *for preventing return of product in said tubular outlet member to said upright central tube;*

D. the container having portions which project radially inwardly from its said upper cylindrical wall portion and surround said central tube, which provide
  (1) a downwardly facing abutment that is engageable by said flange to define an upper limit of axial movement of the delivery piston, and
  (2) an upwardly facing spring seat that opposes said downwardly facing spring seat; and E. a coil spring surrounding said central tube of the delivery piston and reacting between said spring seats to yieldingly bias the delivery piston towards said limit of its upward movement.

2. The dispenser of claim 1, further characterized by:
(1) said container having an upwardly projecting fulcrum portion at its top that is spaced to one side of said outlet member; and
(2) an actuating lever
  (a) having one end pivoted on said fulcrum portion and (b) having at its medial portion a force transmitting connection with the outlet member whereby downward actuating force applied to its other end effects downward actuation of the delivery piston.

3. The dispenser of claim 1 wherein said outlet member is inverted-L-shaped, with an upwardly extending inlet portion and a laterally extending outlet portion, and wherein the top of said outlet portion is formed as a pushbutton by which the outlet member can be depressed for downward actuation of the delivery piston.

4. The dispenser of claim 1 wherein said container has a cylindrical portion at its top that surrounds the lower portion of said outlet member and guides the outlet member in upward and downward motion.

5. The dispenser of claim 4 wherein said cylindrical portion of the container defines an upwardly facing abutment that is engageable by a downwardly facing abutment on said outlet member to define a lower limit of axial movement of the delivery piston.

[6. A dispenser for paste-like products comprises a container for holding a supply of product to be dispensed, said container having a lower cylindrical wall portion that is closed by a closure piston which is slideable upwardly therein and is displaced upwardly by atmospheric pressure as product is dispensed from the container, and repetitively actuatable delivery means at an upper portion of the container whereby a limited amount of product can be dispensed at each actuation, said dispenser being characterized by:

A. said delivery means comprising (1) a delivery piston (a) which has a peripheral portion that axially slidably and sealingly engages an upper cylindrical wall portion of the container all around the same and (b) which substantially closes said upper wall portion of the container, opposes said closure piston and cooperates with it in defining the interior of the container so that downward movement of the delivery piston decreases the volume of said interior, (2) an upwardly projecting dispensing portion on the delivery piston, (a) the exterior of which comprises means whereby the delivery piston can be manually displaced downward and (b) which has an outlet at its top that is communicable through its interior and through an aperture in the delivery piston with the interior of the container, and (3) a non-return valve in said dispensing portion for controlling communication between the interior of the container and said outlet and whereby product displaced from the container by downward movement of the delivery piston is permitted to flow upward to said outlet but displaced product is prevented from flowing back into the container upon upward movement of the delivery piston; and B. locking means on said closure piston cooperating with the container to prevent downward movement of the closure piston but permit upward movement thereof.]

[7. The dispenser of claim 6, further characterized by:

C. means on the container providing an abutment engageable by the delivery means to define an upper limit of axial sliding movement of the delivery piston; and D. spring means reacting between the container and the delivery piston to bias the latter upwardly towards said limit.]

[8. The dispenser of claim 7, further characterized by:

E. means on the container providing a further abutment engageable by the delivery means to define a lower limit of axial movement of the delivery piston.]

*9. A dispenser for paste-like products comprising a container for holding a supply of product to be dispensed, said container having a lower cylindrical wall portion that is closed by a closure piston which is slideable upwardly therein and is displaced upwardly by atmospheric pressure as product is dispensed from the container but is confined against downward sliding, and repetitively actuatable delivery means at an upper portion of the container whereby a limited amount of product can be dispensed at each actuation, said delivery means being characterized by:*

*A. a delivery piston comprising*

*(1) an upright central tube and*

*(2) a concentric, radially outwardly projecting flange around the bottom of said central tube, the periphery of which is formed as a sealing lip that axially slideably and sealingly engages an upper cylindrical wall portion of the container all around the same;*

*B. a tubular outlet member*

*(1) having a product outlet at an upper end thereof, and*

*(2) having a lower portion which surrounds and is secured to the upper portion of said central tube of the delivery piston and which defines a downwardly facing spring seat external to said central tube;*

*C. the container having portions that project radially inwardly from its said upper cylindrical wall portion and surround said central tube, which provide*

*(1) a downwardly facing abutment that is engageable by said flange to define an upper limit of axial movement of the delivery piston, and*

*(2) an upwardly facing spring seat that opposes said downwardly facing spring seat;*

*D. a coil spring surrounding said central tube of the delivery piston and reacting between said spring seats to yieldingly bias the delivery piston towards said limit of its upward motion and means in said tubular outlet member for preventing product in said tubular outlet member from returning to said upright central tube.*

*10. The dispenser of claim 9 wherein said tubular outlet member defines, in said lower portion thereof, an internal downwardly facing circumferential shoulder that opposes the top end of said central tube, further characterized by:*

*said means being surrounded by said outlet member and confined between said internal shoulder and the top end of said central tube of the delivery piston.*

* * * * *

UNITED STATES PATENT OFFICE

CERTIFICATE OF CORRECTION

Patent No. Re. 33,247 Dated July 3, 1990

Inventor(s) Jaap Bossina

It is certified that error appears in the above-identified patent and that said Letters Patent is hereby corrected as shown below:

In the title page, line (75), "Japp Bossina" should read

-- Jaap Bossina --;

In the title page, line (73), "Netherlands" should read

-- Switzerland --.

Signed and Sealed this

Eighteenth Day of June, 1991

*Attest:*

*Attesting Officer*

HARRY F. MANBECK, JR.

*Commissioner of Patents and Trademarks*